United States Patent
Craft et al.

(10) Patent No.: US 8,108,549 B2
(45) Date of Patent: Jan. 31, 2012

(54) METHOD FOR USING THE LOOPBACK INTERFACE IN A COMPUTER SYSTEM HAVING MULTIPLE WORKLOAD PARTITIONS

(75) Inventors: David Jones Craft, Austin, TX (US); Vinit Jain, Austin, TX (US); Lance Warren Russell, Rosanky, TX (US); Edward Shvartsman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1455 days.

(21) Appl. No.: 11/397,846

(22) Filed: Apr. 4, 2006

(65) Prior Publication Data

US 2007/0233897 A1   Oct. 4, 2007

(51) Int. Cl.
*G01R 31/08* (2006.01)
*G06F 15/167* (2006.01)
*G06F 15/173* (2006.01)
*H04L 12/28* (2006.01)

(52) U.S. Cl. ......... 709/238; 370/249; 370/392; 709/215
(58) Field of Classification Search .................. 709/238, 709/215; 370/249, 392
See application file for complete search history.

(56) References Cited

U.S. PATENT DOCUMENTS

| | | | | |
|---|---|---|---|---|
| 5,740,438 A | * | 4/1998 | Ratcliff et al. ................ | 709/250 |
| 6,330,616 B1 | * | 12/2001 | Gioquindo et al. ........... | 709/236 |
| 6,466,548 B1 | | 10/2002 | Fitzgerald | |
| 6,778,540 B1 | * | 8/2004 | Ratcliff et al. ................ | 370/401 |
| 6,973,042 B1 | | 12/2005 | Fitzgerald | |
| 7,146,377 B2 | * | 12/2006 | Nowicki et al. ........................ | 1/1 |
| 7,191,342 B1 | * | 3/2007 | New et al. ..................... | 713/190 |
| 7,362,752 B1 | * | 4/2008 | Kastenholz ................... | 370/389 |
| 7,415,034 B2 | * | 8/2008 | Muller et al. ................. | 370/463 |
| 7,444,350 B1 | * | 10/2008 | MacKinnon et al. ................. | 1/1 |
| 2002/0073233 A1 | * | 6/2002 | Gross et al. .................... | 709/245 |
| 2003/0195895 A1 | * | 10/2003 | Nowicki et al. ............... | 707/100 |
| 2003/0236852 A1 | * | 12/2003 | Fernandes et al. ............ | 709/215 |
| 2004/0085965 A1 | | 5/2004 | Fotedar | |

(Continued)

OTHER PUBLICATIONS

Leon-Garcia, Alberto and Widjaja, Indra ."Communication Networks, Fundemental Concepts and Key Architectures", 2004, McGraw-Hill, 2nd ed., pp. 276-278.*

(Continued)

*Primary Examiner* — Phuoc Nguyen
*Assistant Examiner* — Daniel Murray
(74) *Attorney, Agent, or Firm* — Yee & Associates, P.C.; Steven L. Bennett

(57) ABSTRACT

In a computer system divided into multiple separate workload partitions, wherein at least one of the partitions contains multiple applications, and a loopback interface is made available to each partition, a method is provided for routing packets from one application to another application. In one embodiment of the invention, each packet to be routed from one application to another application in the same home partition comprises a first packet, and all other packets comprise second packets. The method comprises the steps of assigning the same pre-specified IP address to each of the first packets, and routing each of the first packets from its home partition to a loopback interface at the IP network processing layer. The method further includes marking the first packets to identify the home partition of each first packet, and directing the marked first packets to a mechanism configured to deliver each first packet only to its home partition, in response to the markings. Each second packet is assigned the IP address of its intended destination, and routed thereto over the loopback interface.

17 Claims, 4 Drawing Sheets

U.S. PATENT DOCUMENTS

| | | | |
|---|---|---|---|
| 2004/0255047 A1* | 12/2004 | Larson et al. | 709/249 |
| 2005/0018669 A1* | 1/2005 | Arndt et al. | 370/389 |
| 2005/0071502 A1 | 3/2005 | Kamat et al. | |
| 2005/0129040 A1* | 6/2005 | Kiel et al. | 370/412 |
| 2005/0204366 A1* | 9/2005 | Billau et al. | 719/324 |
| 2006/0075123 A1* | 4/2006 | Burr et al. | 709/228 |
| 2007/0088829 A1* | 4/2007 | Shima et al. | 709/226 |
| 2007/0150699 A1* | 6/2007 | Schoinas et al. | 712/13 |
| 2007/0253328 A1* | 11/2007 | Harper et al. | 370/219 |
| 2009/0103443 A1* | 4/2009 | Ku et al. | 370/249 |
| 2010/0017811 A1* | 1/2010 | Sng | 719/328 |
| 2010/0057845 A1* | 3/2010 | Thomas et al. | 709/203 |

OTHER PUBLICATIONS

Deering et al, "RFC 4007—Ipv6 Scop4ed Address Architecture", The Internet Society 2005, pp. 1-18. http://www.faqs.org/rfcs/rfc4007.html, retrieved Jan. 30, 2006.

Hinden et al., "RFC 2373—IP Version 6 Addressing Architecture", The Internet Society 1998, pp. 1-19. http://www.faqs.org/rfcs/rfc2373.html, retrieved Jan. 30, 2006.

Hinden et al., "RFC 3513—Internet Protocol Version 6 (Ipv6 Addressing Architecture", The Internet Society 2003, pp. 1-19. http://www.faqs.org/rfcs/rfc3513.html, retrieved Jan. 30, 2006.

U.S. Appl. No. 08/808,286, filed Feb. 28, 1997, Bennett et al.

* cited by examiner

METHOD FOR USING THE LOOPBACK INTERFACE IN A COMPUTER SYSTEM HAVING MULTIPLE WORKLOAD PARTITIONS

BACKGROUND OF THE INVENTION

1. Field of the Invention

The invention disclosed and claimed herein generally pertains to a method that uses the loopback interface and loopback address to route datagrams or other information carrying packets in a computer system. More particularly, the invention pertains to a method of the above type wherein the computer system is divided into multiple workload partitions, and at least some of the partitions have two or more applications. Even more particularly, the invention pertains to a method of the above type wherein the loopback address is used to route packets from one application in a workload partition to a different application in the same partition.

2. Description of the Related Art

As is well known by those of skill in the art, a loopback address is a special Internet Protocol (IP) number (127.0.0.1) that is designated for the software loopback interface of a computer system. The loopback interface has no hardware associated with it, and is not physically connected to a network. The loopback interface operates on the IP network layer, or common processing layer, and enables a client and a server on the same host to communicate with each other using TCP/IP. The loopback interface also acts to prevent datagrams with the loopback address from leaving the host.

It is further well known to divide a computer system into separate partitions, wherein each partition has one or more associated applications. Different workloads are run on respective partitions, wherein strong separation is enforced between running workloads. Workload partition arrangements of this type can be very beneficial in carrying out certain tasks and applications. Moreover, applications in respective partitions may seek to use the loopback address, described above. Accordingly, the loopback address must be made available to each workload partition.

In a partitioned computer system as described above, if a datagram or information carrying packet is to be routed from a first partition to a second partition, the IP address of the second partition is applied to the packet as its destination address. The packet is then directed to the IP network layer, and processed for routing to the second partition. Similarly, if a packet is to be sent from a partition in the computer system to a location outside the system, the packet is given the IP address of the location. The packet is again sent to the IP layer initially, and then routed to the location. However, it frequently happens that a packet must be sent from one application in a partition to a different application that is located in the same partition. Applications would prefer to use the loopback address in this situation, if they could do so, as they are guaranteed to be communicating within that partition and can also assume a level of trust when using the loopback address as it is in the same partition. However, at present the loopback address is available to all partitions, so that all partitions would receive a packet that used the loopback address. To increase efficiency it would be desirable, in this case, to provide some mechanism or technique for ensuring that the packet went only to the different application located in the same partition.

SUMMARY OF THE INVENTION

The invention is directed to a method and apparatus for a computer system that is divided into multiple separate workload partitions, wherein at least one of the partitions contains multiple applications. A single loopback address, on a loopback interface associated with the system, is made available to each partition. In one embodiment of the invention, directed to a method for routing information packets within a computer system that includes multiple workload partitions, each packet to be routed from one application to another application in the same partition comprises a first packet, and all other packets comprise second packets. The method comprises the steps of assigning the same loopback address to each of the first packets, and routing each of the first packets from its home partition to a loopback interface at the IP network processing layer. The method further includes marking the first packets to identify the home partition of each first packet, and directing the marked first packets to a mechanism configured to deliver each first packet only to its home partition, in response to the markings. Thus, each first packet will be correctly delivered, even though the loopback address is available to all other partitions. Each second packet is assigned an IP address to identify its intended destination, and routed for processing at the IP network layer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
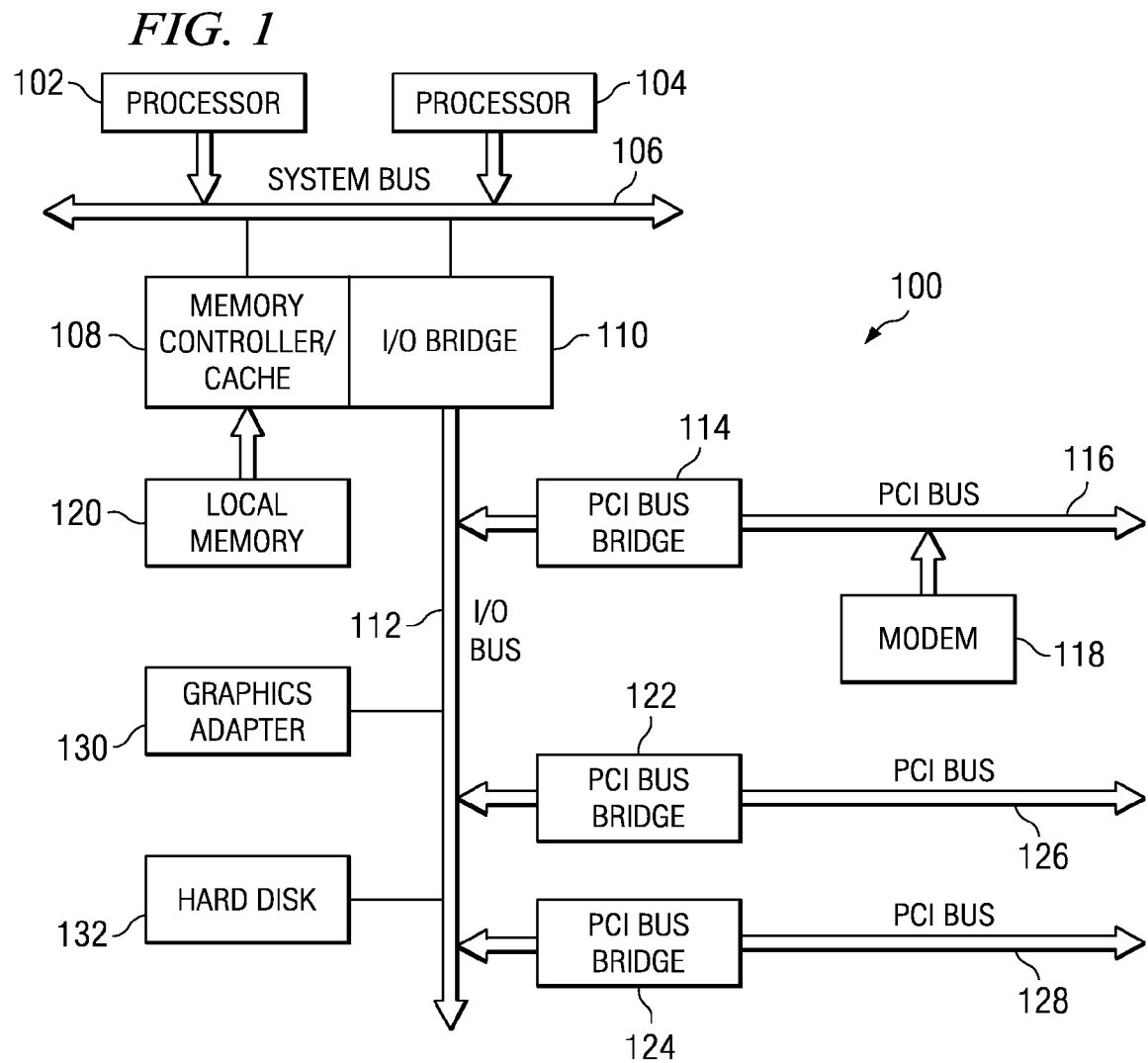
FIG. 1 is a block diagram showing a computer system provided with multiple processors that may be used in implementing an embodiment of the invention.

Referring to FIG. 1, there is shown a block diagram depicting a computer system 100 that may be used to implement an embodiment of the invention. Computer system 100 includes a plurality of processors, such as 102 and 104 connected to system bus 106. Also connected to system bus 106 is memory controller/cache 108, which provides an interface to local memory 120. An I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems such as 118 may be connected to PCI bus 116. Typical PCI bus implementations will support four PCI expansion slots or add-in connectors. Additional PCI bus bridges 122 and 124 provide interfaces for additional PCI buses 126 and 128, from which additional modems or network adapters may be supported. Computer system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware shown in FIG. 1 may vary. The depicted example is not meant to imply architectural limitations with respect to the present invention. The computer system depicted in FIG. 1 may be, for example, an IBM RISC/System 6000 system, a product of International Business Machines Corporation in Armonk, N.Y., running the Advanced Interactive Executive (AIX) operating system. Alternatively, the operating system may be another commercially available operating system such as JavaOS For Business™ or OS/2™, which are also available from IBM.

Figure 2:
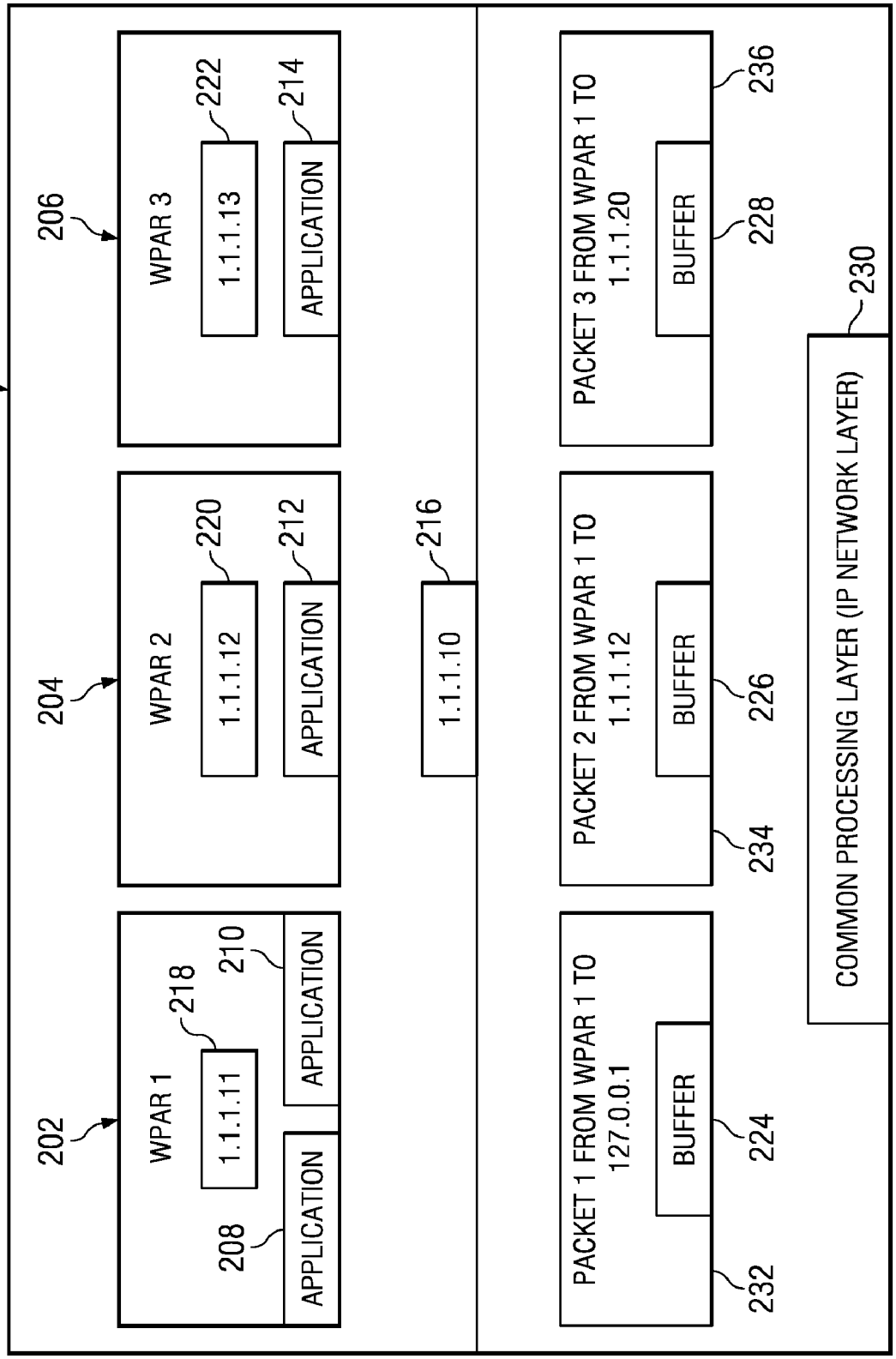
FIG. 2 is a schematic diagram depicting a computer system separated into workload partitions, for use in illustrating an embodiment of the invention.

Referring to FIG. 2, there is shown a computer system 200 that has been partitioned into three workload partitions WPAR 1, WPAR 2, and WPAR 3. Computer system 200 may, for example, comprise the computer system 100 described in connection with FIG. 1. The partitions WPAR 1-3 are also referenced as workload partitions 202-206, respectively. FIG. 2 shows workload partition 202 provided with multiple applications 208 and 210 and an IP address 218 of 1.1.1.11. Partition 204 has an application 212 and an IP address 220 of 1.1.1.12. Partition 206 has an application 214 and an IP address 222 of 1.1.1.13. The IP address 216 of computer system 200 is shown to be 1.1.1.10.

In addition to the IP addresses 218-222, each of the partitions 202-206 is provided with the loopback address 127.0.0.1. This address is needed, since at least some of the applications of the workload partitions may explicitly try to use the loopback address.

Referring further to FIG. 2, there are shown several packets 232-236, wherein each packet is to be sent from an application of WPAR 1 to another application. More particularly, Packet 1 is to be sent from application 208 located in WPAR 1 to application 210, which is also located in WPAR 1. Packet 2 is to be sent from application 208 in WPAR 1 to application 212, located in WPAR 2. Packet 3 is to be sent from application 208 in WPAR 1 to an application that is located outside of computer system 200. In order to respectively accomplish these routings, an IP destination address is assigned to each of the Packets 1-3, in accordance with an embodiment of the invention.

As further shown by FIG. 2, the destination IP address 127.0.0.1 is assigned to Packet 1, which is being sent to a different application in the same workload partition, as stated above. This destination address is the loopback address, and such address directs Packet 1 to the loopback interface associated with the common processing layer, or IP network layer 230. Computer system 200 is configured to provide the loopback interface, wherein the loopback interface acts to prevent any packet with the loopback address from exiting computer system 200.

A further effect of assigning the loopback address to Packet 1 would be to direct Packet 1 to each partition that has the loopback address as an IP address. As described above, each of the workload partitions 202-206 in fact is provided with the loopback address, even though Packet 1 must go only to partition 202, that is, WPAR 1. Accordingly, a feature of an embodiment of the invention is to specifically mark Packet 1, to indicate that Packet 1 belongs only to WPAR 1. Such marking is usefully carried out by means of a memory buffer 224, which carries or is otherwise associated with Packet 1. More particularly, when Packet 1 arrives at IP layer 230, the buffer 224 provides a partition identifier in a field that identifies WPAR as the home workload partition of Packet 1, that is, the partition that Packet 1 belongs to. The partition identifier is used in connection with sockets, as further described in connection with FIG. 3, to ensure that Packet 1 is delivered only to WPAR 1.

FIG. 2 further shows the destination address 1.1.1.12 assigned to Packet 2, which is the IP address 220 of WPAR 2. Thus, at the IP network layer 230, Packet 2 will be routed to an application in WPAR 2 as intended. Similarly, the destination IP address 1.1.1.20 is assigned to Packet 3. Neither computer system 200 nor any of the partitions 202-206 has this address. Accordingly, Packet 3 at the IP network layer 230 will be routed to a destination application outside of computer system 200, as intended. FIG. 2 further shows the memory buffers 226 and 228 carrying Packets 2 and 3, respectively.

Figure 3:
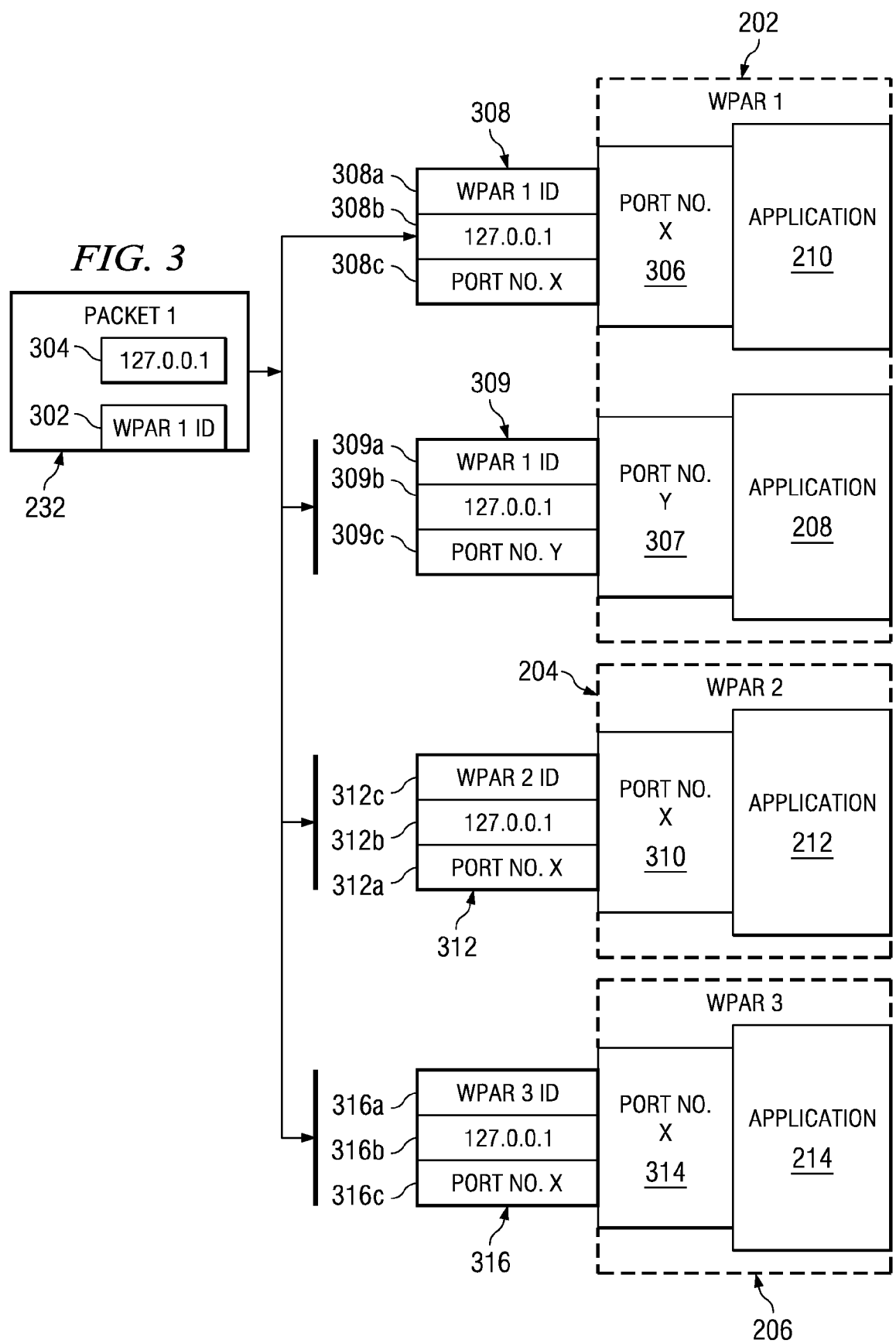
FIG. 3 is a schematic diagram illustrating delivery of a packet in the embodiment of FIG. 2.

Referring to FIG. 3, there is shown Packet 1 marked with a WPAR 1 partition identifier 302, as described above. Packet 1 is also shown carrying the loopback address 304.

Referring further to FIG. 3, it is seen that partition WPAR 1 is provided with a port 306, having a port number X, for enabling delivery of packets to the application 210 of partition WPAR 1. A socket 308 is connected to port 306, for use in granting or denying packet access to port 306. The socket 308 is furnished with three identification elements 308a-c, respectively comprising a partition identifier, a partition address and the number of the connected port. For socket 308, the partition identifier 308a is the identifier for WPAR 1. The partition address is the loopback address, and the port number is the number for port 306.

WPAR 1 is additionally provided with a port 307, having a port number Y, for enabling delivery of packets to the application 208 of partition WPAR 1. A socket 309 is connected to port 307, for use in granting or denying packet access to port 307. In like manner with socket 308, socket 309 is furnished with three identification elements 309a-c, respectively comprising a partition identifier, a partition address and the number of the connected port. As with socket 308, the partition identifier 309a of socket 309 is the identifier for WPAR 1, and the partition address 309b is the loopback address. However, the port number 309c is Y, the number for port 307, rather than X. Thus, port number is used to route Packet 1 to the correct application within WPAR1, and to prevent Packet 1 from reaching a wrong application therein.

FIG. 3 similarly shows a port 310 for application 212 of WPAR 2, and a port 314 for application 214 of WPAR 3. A socket 312 is connected to port 310, and a socket 316 is connected to port 314. The elements 312a-c for socket 312 respectively comprise the partition identifier, the loopback address and the port number for port 310. In like manner, the elements 316a-c for socket 316 respectively comprise the partition identifier for WPAR 3, the loopback address and the port number for port 314.

In the arrangement shown by FIG. 3, each of the sockets 308, 309, 312 and 316 has the same address as the loopback destination address 304 of Packet 1. However, only socket 308 has both the same partition identifier, to identify workload partition WPAR 1, and the same port number X, to identify the proper application contained in WPAR1. Accordingly, only socket 308 allows correct delivery of Packet 1, to workload partition WPAR 1 and to application 210 thereof. On the other hand, sockets 309, 312 and 316 act to prevent Packet 1 from entering partition WPAR 2 or WPAR 3, or any other application of WPAR1.

Figure 4:
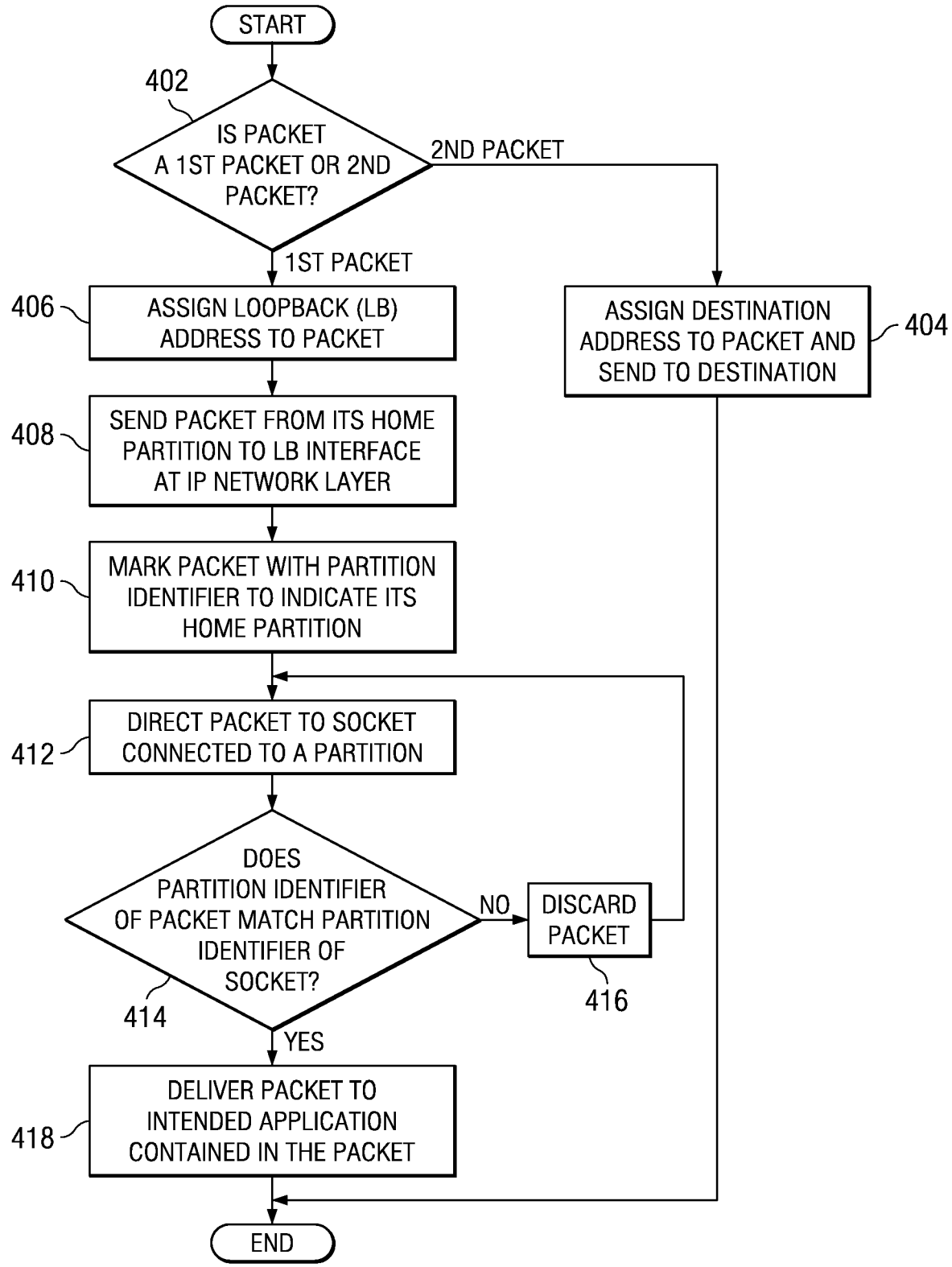
FIG. 4 is a flow chart showing respective steps for an embodiment of the invention.

Referring to FIG. 4, there is shown a flow chart illustrating steps of a method or procedure comprising an embodiment of the invention. In accordance with the embodiment, a packet will be one of two types. Thus, at step 402, it is necessary to initially decide whether a packet is a first or a second packet, or packet type.

The packet is a first packet if it is to be routed from one application in a workload partition to a different application in the same partition. For convenience, the partition that a first type of packet comes from is referred to herein as the home partition of the first packet, since the first packet is not permitted to enter any other partition.

Packets of the second type, or second packets, are to be routed from a given partition to an application that is located somewhere outside of the given partition. Thus, a second packet could be directed to an application that is either in another partition of the computer system, or is at a location outside the system. As shown by step 404, if a packet is a second packet, it is assigned the address of its intended destination. The second packet is then routed to its intended destination. The routing procedure then comes to an end.

Referring further to FIG. 4, step 406 shows that if a packet is of the first type, the loopback address is assigned thereto. As respectively shown by steps 408 and 410, the first packet is then sent from its home partition to the loopback interface, at the IP network layer, and marked with a partition identifier to indicate its home partition. At step 412, the marked first packet is directed to a socket that is connected to one of the partitions. If the partition identifier of the packet does not match the partition identifier of the socket, the packet is discarded by the socket, as indicated by steps 414 and 416. As described above, this practice will serve to keep a first packet from being admitted into any partition except its own home partition.

At step 418, a match occurring between the partition identifier of the packet and the partition identifier of the socket indicates that the socket is connected to the home partition of the packet. Accordingly, the packet is delivered to the intended application contained in its home partition.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for routing information packets within a computer system, the method comprising:
   routing a first packet from a first application to a second application, wherein the computer system includes a plurality of partitions, and wherein a first partition of the plurality of partitions contains the first application and the second application, and wherein a second packet is routed from the first application to a destination outside of the first partition;
   assigning a pre-specified destination IP address number to the first packet;
   routing the first packet from the first partition to a loopback interface at an IP network processing layer;
   associating the first packet with a field containing a partition identifier for the first partition; and
   directing the first packet to a mechanism configured to deliver the first packet to the first partition and prevent delivery of the first packet to a remaining one or more partitions of the plurality of partitions, in response to identifying the partition identifier, wherein the mechanism is further configured to route the first packet to the second application and prevent delivery of the first packet to any other application in the plurality of partitions.

2. The method of claim 1, wherein:
   the method further comprises the assigning an IP address to the second packet, wherein the IP address identifies the destination of the second packet.

3. The method of claim 1, wherein:
   the pre-specified destination IP address number assigned to the first packet comprises a loopback address number that is provided for use in routing the first packet in relation to the loopback interface.

4. The method of claim 1, wherein:
   the partition identifier for the first packet is stored in a memory buffer.

5. The method of claim 1, wherein:
   the mechanism comprises a plurality of sockets, wherein each of the plurality of sockets is connected to one of the plurality of partitions.

6. The method of claim 5, wherein:
   a first socket of the plurality of sockets is connected to the first partition, wherein the first socket is adapted to allow the first packet to be delivered to the first partition in response to identifying the partition identifier.

7. The method of claim 6, wherein:

the first socket is provided with the partition identifier, a partition address for the first partition, and a port number pertaining to the second application.

8. A computer program product for routing information packets within a computer system, the computer program product comprising a non-transitory computer readable medium comprising:

first instructions for routing a first packet from a first application to a second application, wherein the computer system includes a plurality of partitions, and wherein a first partition of the plurality of partitions contains the first application and the second application, and wherein a second packet is routed from the first application to a destination outside of the first partition;

second instructions for assigning a pre-specified destination IP address number to the first packet;

third instructions for routing the first packet from the first partition to a loopback interface at an IP network processing layer;

fourth instructions for associating the first packet with a field containing a partition identifier for the first partition; and fifth instructions for directing the first packet to a mechanism configured to deliver the first packet to the first partition and prevent delivery of the first packet to a remaining one or more partitions of the plurality of partitions, in response to identifying the partition identifier, wherein the mechanism is further configured to route the first packet to the second application and prevent delivery of the first packet to any other application in the plurality of partitions.

9. The computer program product of claim 8, wherein:

fifth instructions are provided for assigning an IP address to the second packet, wherein the IP address identifies the destination of the second packet.

10. The computer program product of claim 8, wherein:

the pre-specified destination IP address number assigned to the first packet comprises a loopback address number that is provided for use in routing the first packet in relation to the loopback interface.

11. The computer program product of claim 8, wherein:

the partition identifier for the first packet is stored in a memory buffer.

12. The computer program product of claim 8, wherein:

the mechanism comprises a plurality of sockets, wherein each of the plurality of sockets is connected to one of the plurality of partitions.

13. The computer program product of claim 12, wherein:

a first socket of the plurality of sockets is associated with the first partition, wherein the first socket is adapted to allow the first packet to be delivered to the first partition in response to identifying the partition identifier.

14. The computer program product of claim 13, wherein:

the first socket is provided with the partition identifier, a partition address for the first partition, and a port number pertaining to the second application.

15. Apparatus for routing information packets within a computer system, the apparatus comprising:

a first processor device for routing a first packet from a first application to a second application, wherein the computer system includes a plurality of partitions, and wherein a first partition of the plurality of partitions contains the first application and the second application, and wherein a second packet is routed from the first application to a destination outside of the first partition:

a second processor device for assigning a pre-specified destination IP address number to the first packet;

a third processor device for routing the first packet from the first partition to a loopback interface at an IP network processing layer;

a memory buffer operable to associate the first packet with a field containing a partition identifier for the first partition; and a mechanism disposed to receive the first packet, and configured to deliver the first packet to the first partition and prevent delivery of the first packet to a remaining one or more partitions of the plurality of partitions, in response to identifying the partition identifier, wherein the mechanism is further configured to route the first packet to the second application and prevent delivery of the first packet to any other application in the plurality of partitions.

16. The apparatus of claim 15, wherein:

the apparatus further comprises a third processor device for assigning an IP address to the second packet, wherein the IP address identifies the destination of the second packet.

17. The apparatus of claim 15, wherein:

the mechanism comprises a plurality of sockets, wherein each of the plurality of sockets is connected to one of the plurality of partitions.

* * * * *